US008287340B2

(12) United States Patent
Gregorin

(10) Patent No.: US 8,287,340 B2
(45) Date of Patent: Oct. 16, 2012

(54) SYSTEM AND METHOD FOR EMPLOYEE INCENTIVE GAME

(75) Inventor: Adam C. Gregorin, New York Mills, NY (US)

(73) Assignee: Par Technology Corporation, New Hartford, NY (US)

( * ) Notice: Subject to any disclaimer, the term of this patent is extended or adjusted under 35 U.S.C. 154(b) by 2418 days.

(21) Appl. No.: 10/417,774

(22) Filed: Apr. 17, 2003

(65) Prior Publication Data

US 2004/0209661 A1 Oct. 21, 2004

(51) Int. Cl.
*A63F 13/00* (2006.01)

(52) U.S. Cl. .................................. 463/9; 463/7; 705/16

(58) Field of Classification Search .................... 705/10, 705/14, 16; 463/9, 25, 7
See application file for complete search history.

(56) References Cited

U.S. PATENT DOCUMENTS

| | | | | |
|---|---|---|---|---|
| 4,310,885 | A | 1/1982 | Azcua et al. | |
| 4,864,499 | A | 9/1989 | Casey | |
| 5,915,244 | A | 6/1999 | Jack et al. | |
| 5,924,072 | A | 7/1999 | Havens | |
| 5,924,077 | A * | 7/1999 | Beach et al. | 705/10 |
| 5,926,794 | A | 7/1999 | Fethe | |
| 6,049,779 | A | 4/2000 | Berkson | |
| 6,055,511 | A | 4/2000 | Luebbering et al. | |
| 2002/0002522 | A1 | 1/2002 | Clift | |
| 2002/0010614 | A1 | 1/2002 | Arrowood | |
| 2002/0035506 | A1 | 3/2002 | Loya | |
| 2002/0038251 | A1 | 3/2002 | Sheprow et al. | |
| 2002/0042742 | A1 | 4/2002 | Glover et al. | |
| 2002/0046091 | A1 | 4/2002 | Mooers et al. | |
| 2002/0046110 | A1 | 4/2002 | Gallagher | |
| 2002/0062253 | A1 | 5/2002 | Dosh, Jr. et al. | |
| 2002/0116257 | A1 | 8/2002 | Helbig | |
| 2002/0123925 | A1 | 9/2002 | Smith | |
| 2002/0123926 | A1 | 9/2002 | Bushold et al. | |
| 2002/0143626 | A1 | 10/2002 | Voltmer et al. | |
| 2002/0169671 | A1 | 11/2002 | Junger | |
| 2002/0178048 | A1 * | 11/2002 | Huffman | 705/11 |

OTHER PUBLICATIONS

Jim Sullivan, Sales contest basics inspire competition an profits—People, Performance & Profits—employee contests—Brief Article, Sep. 2, 2002, (http://www.findarticles.com/p/articles/mi_m3190/is_35_36/ai_91212149/print).*

Prgeny marketing Innovations, Seven Sensational Sale Contests, 2002, (http://web.archive.org/web/20021208011914/http://www.progenymarketing.com/resources/marketing_b3.htm.*

* cited by examiner

*Primary Examiner* — Michael Cuff
(74) *Attorney, Agent, or Firm* — George R. McGuire; Bond Schoeneck & King

(57) ABSTRACT

An employee incentive game overlies a sales application used with POS terminals. The game includes a back office portion and a front end employee interface portion. The game parameters, which are set up on the back office portion, identify a start time, a stop time, and a predetermined sales item which is the subject of the game. Each time the predetermined item is sold, the selling cashier receives a point. The front end interface portion informs the cashier of the predetermined sales item, identifies the game parameters, and graphically displays a score card whenever prompted to do so. The score card also shows the standings of the other cashiers in the game. The standings are updated in real time via the POS terminal data gathered by the sales application. At the end of the game, the cashier with the most points is recognized.

16 Claims, 2 Drawing Sheets

Employee Incentive Interface – Crew Interface

SYSTEM AND METHOD FOR EMPLOYEE INCENTIVE GAME

FIELD OF THE INVENTION

This invention relates generally to the field of rewarding employees based on data gathered from point of sale (POS) terminals, and more particularly to an employee incentive game established and monitored through a POS terminal system.

BACKGROUND OF THE INVENTION

Electronic point of sale (POS) terminals are ubiquitous in stores, and especially so in large franchise operations. These terminals have replaced cash registers because of their data gathering capabilities in addition to their cash accounting capabilities. Such data typically include the identification of the store and location of the POS terminal, the identity of the cashier, the price and identification of the items sold, and the date and time of the sale. POS terminals are frequently connected to an inventory control system which is used to track goods and reorder inventory when necessary.

Many applications have been developed to process and analyze the data gathered via POS terminals. For example, U.S. Pat. No. 5,924,077 (Beach et al.) discloses a system that monitors and processes the raw data collected by POS terminals.

Some systems monitor and reward the performance of the sales personnel. For example, U.S. Patent Application Pub. No. US 2002/0123925 (Smith) discloses a business method and system for rewarding call center agents using an automated call distribution center. Others provide performance feedback to the manager or to individual employees, such as is disclosed in U.S. Patent Application Pub. No. US 2002/0178048 (Huffman).

SUMMARY OF THE INVENTION

Briefly stated, an employee incentive game overlies a sales application used with POS terminals. The game includes a back office portion and a front end employee interface portion. The game parameters, which are set up on the back office portion, identify a start time, a stop time, and a predetermined sales item which is the subject of the game. Each time the predetermined item is sold, the selling cashier receives a point. The front end interface portion informs the cashier of the predetermined sales item, identifies the game parameters, and graphically displays a score card whenever prompted to do so. The score card also shows the standings of the other cashiers in the game. The standings are updated in real time via the POS terminal data gathered by the sales application. At the end of the game, the cashier with the most points is recognized.

According to an embodiment of the invention, a system with an employee incentive game overlaid on a point of sale (POS) terminal system includes a back office portion which includes first means for setting up said game on said POS system; and a front office portion which includes second means for an employee to determine a real-time score of said employee compared with all other employees participating in said game.

According to an embodiment of the invention, a method for implementing an employee incentive game on a point of sale (POS) terminal system includes the steps of (a) setting up said game on said POS system; (b) determining a real-time score of an employee participating in said game; and (c) displaying to said employee real-time scores of all other employees participating in said game.

DETAILED DESCRIPTION OF THE PREFERRED EMBODIMENT

Figure 1:
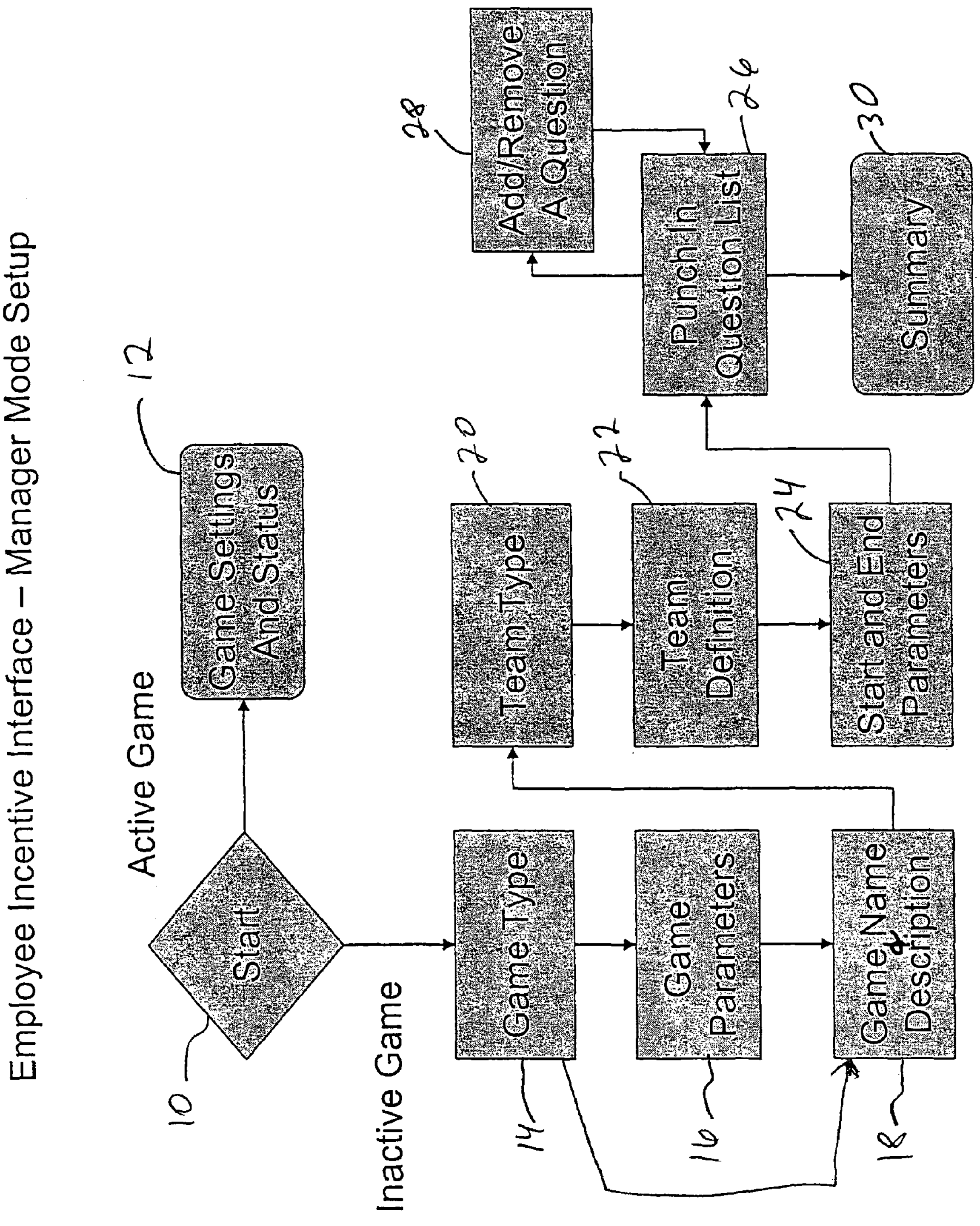
FIG. 1 shows a flow chart showing the methodology of the system for the back office portion of the present invention.

Referring to FIG. 1, a flow chart showing the methodology of the system for the back office portion of the present invention is shown. The back office portion is designed for the manager or other supervisory personnel. The back office portion is accessed either on the manager's terminal or on a cashier's terminal when the manager enters a passcode or in some systems swipes the manager's passcard. The system starts at step 10. If a game is active, the manager views the game settings and status at step 12. When the manager wants to set up a new game, the game style is chosen at step 14. Examples of game styles include "combos", i.e., combination meals with individual items that are upsized or downsized, specific menu items, i.e., ordering single or multiple items, speed of service (SOS), i.e., the speed of service through a drive through lane or at the counter, or any other performance characteristics that are capable of being captured through the POS terminals.

Once the game style is selected in step 14, various game parameters are selected in step 16 depending on the game style. Some styles don't need extra parameters, in which case the system goes to step 18. Otherwise, game parameters are selected in step 16. For example, if the game style is "menu items", then all the menu items are preferably displayed in a drop down list and the menu item or items for the game are selected by "dragging" the item. In step 18, the game is given a name and a description, preferably one that makes sense to the manager and/or employees. In step 20, the manager selects the team style. Examples of team styles include single employee, teams of employees (with the number of employees per team specified), shift teams, hourly teams, and stores. After the team style is chosen, the teams themselves are defined in step 22. If the team style is "teams of employees", personnel for teams can be chosen by name or can be automatically chosen at random preferably via a randomizer function. If the team style is "hourly teams", the time intervals that define the hourly teams, preferably starting at midnight, are entered. The start and end parameters are entered in step 24. The start time is entered, with the game beginning at the start time. The default start time is preferably the current time. The end time is then entered, with the game ending at the end time.

In step 26, at least one list of questions and possible answers are displayed. One question list is chosen. Question lists are preferably related to the technical and professional knowledge that the employees are expected to learn, but can be in any field, from history relating to a particular day such as July 4th for a game on July 4th, to current events or items of local interest. Correct answers to questions preferably add points to a team's score, while incorrect answers optionally subtract points from a team's score. In step 28, questions are selected from the question list and either added or removed from the game. Possible answers and the correct answer are also selected. In step 30, the game summary is preferably displayed. The game summary shows the current settings and status. The manager preferably has the ability to manually end the game during this step. Step 30 is similar to step 12, but step 12 displays the current game status in addition to all the game summary settings, while step 30 only displays the game summary settings.

Figures 2A, 2B:
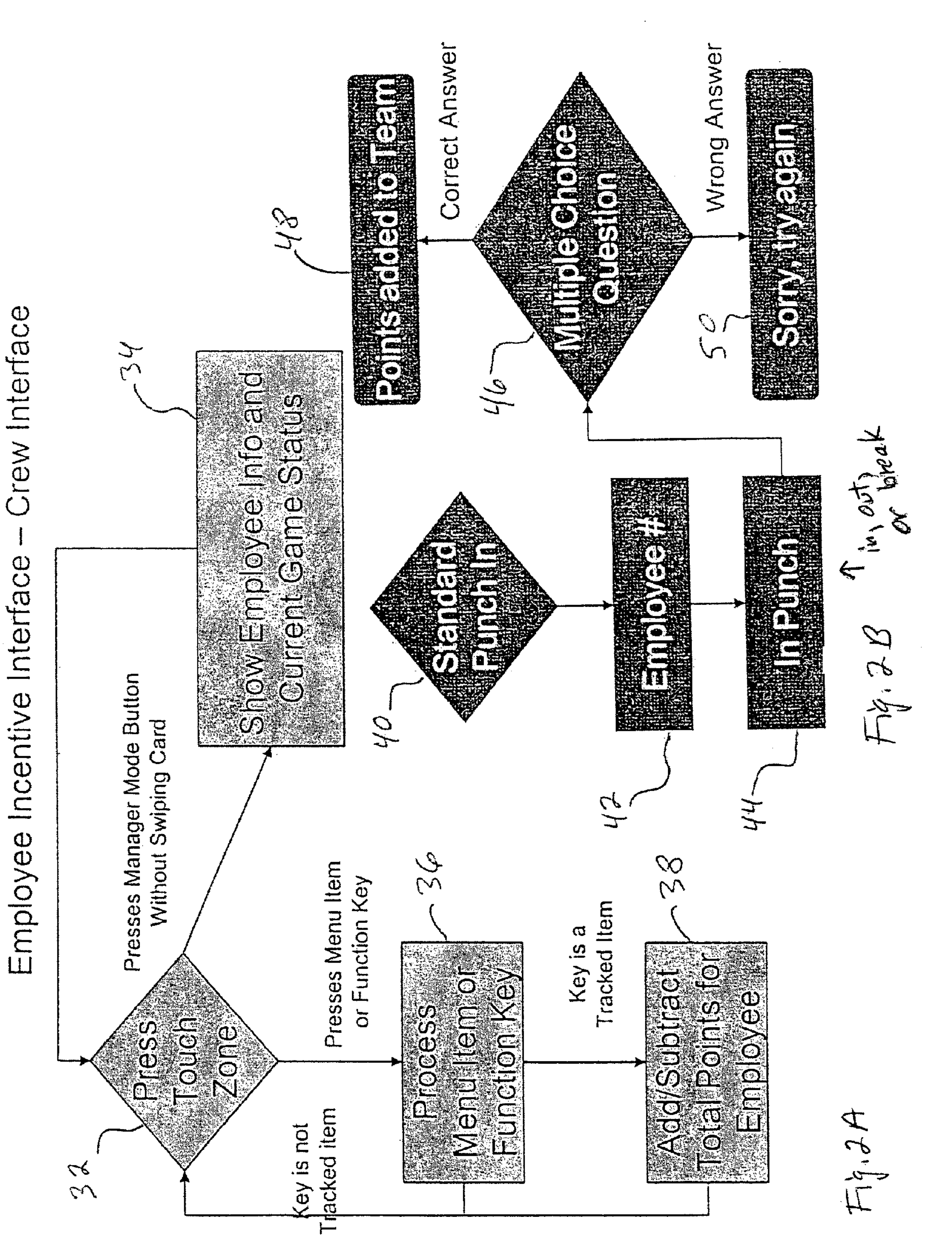
FIG. 2A shows a flow chart shows the interface of the system for the front office portion of the present invention.
FIG. 2B shows a flow chart showing the interface of the system with modern POS registers.

Referring to FIG. 2A, a flow chart shows the interface of the system for the front office portion of the present invention. The front office portion is designed for the employees actually playing the game as part of their normal cashier duties. When the cashier presses the button or touch zone for ordering an item in step 32, if the button or touch zone is for the "Manager Mode" and no manager's card is swiped, the system preferably displays the employee info and current game status in step 34. If button or the touch zone is for a menu item or function key, the system checks in step 36 to see if the key is for a game-tracked item. If not, control reverts to step 32. If the key is for a game-tracked item, points are added, or in some variations, subtracted, from the appropriate field tracking the total points for the designated team style.

Referring to FIG. 2B, a flow chart showing the interface of the system with modern POS registers which are used as time clocks to track an employee's work hours. The game of the present invention envisions permitting employees who are not cashiers to participate in the game when an appropriate team style is designated. This participation is preferably done by giving the non-cashier employees an opportunity to answer a question correctly when punching in, whether for the first time each day or also when punching in after a break. In step 40, the employee presses the button or touch zone to begin punching in, after which the employee number is entered in step 42. The employee actually punches in at step 44, after which a multiple choice question is preferably presented to the employee in step 46. If the employee provides the correct answer, points are added to the team in step 48; otherwise, a message is displayed such as "Sorry, try again" to the employee in step 50. The game optionally permits all employees to answer questions for points, in which case, non-cashiers preferably receive more points for a correct answer than do the cashiers.

The information that needs to be tracked is (1) the game scoring, and (2) the team setup. The preferred implementation of the data structures for the embodiment of the invention is as follows:

```
MAXtEMP = 255
struct Employee__Incentive
{
   unsigned int Employee__Value[MAXtEMP];
   unsigned int EMP__SOS__Orders[MAXtEMP];
   unsigned char GameType;
   unsigned int Game__Components[10];
   unsigned char GameName[25];
   unsigned char TeamType;
   unsigned char Team__Definition{MAXtEMP];
   unsigned char StartDate[3];
   unsigned char StartTime[3];
   unsigned char EndDate[3];
   unsigned char EndTime[3];
}EmployeeIncentive;
```

where Employee_Value is where the raw score is stored,

EMP_SOS_Orders is the quantity of orders taken for SOS calculations,

GameType is the style of game that is currently running,

Game_Components stores the items being tracked for the menu item style game,

GameName stores the identifier for the game,

TeamType indicates which style of team is currently running,

Team_Definition stores the makeup of the team,

StartDate/StartTime stores when the game begins, and

EndDate/EndTime stores when the game ends.

The scoring structure depends on the team style. There is preferably only one large scoring buffer, the size of all employees, and it is a large integer. For "single employee" team style, the scoring buffer keeps track of each point per employee in the employee's "bucket." For example, every time Employee 1 orders the specific menu item which is the subject of the game, such as a hamburger, the employee receives a point recorded in a field such as Employee_Value [0]. The score for Employee 2 is recorded in a field such as Employee_Value[1]. When Employee 1 views the score, the score versus Employee 2 is also shown, and so on for all employees. For the "team of employees" team style, the scoring is done via a team bucket. If one buffer preferably of size 256 is used, this means there could be 255 teams. For example, Employees 1, 2, and 3 are Team 1. Each time any one of them orders a hamburger, a point is recorded in Employee_Value[0]. With Employees 4, 5, and 6 in Team 2, the points for Team 2 are preferably kept in Employee_Value [1], and so on.

In the "shift teams" team style, the first employee bucket is preferably used for the first shift, and after every shift, the next bucket is used. At the end of the day, the index reverts to the first bucket. For example, Employees 1 and 2 are breakfast workers. For this example, orange juice is the menu item of the day. Every time Employee 1 or 2 orders orange juice, the point goes into Employee_Value[0], because theirs is the first shift of the day. Employees 3 and 4 are lunch workers, so because they are on the second shift of the day, their orders of orange juice cause a point to be entered in Employee_Value [1]. This continues until the end of the day, when the Employee_Value index goes back to 0. A field such a Team_Definition[0] contains the indicator as to which shift is currently being filled.

In the "hourly teams" team style, each interval is treated as an index into the buckets. For example, assume an interval of two hours, with Employee 1 working from 8:00 AM to 12:00 PM. The first hourly definition, stored in Team_Definition, is from 8:00 to 10:00. Assuming that the game is "combos", every time Employee 1 upsizes a combo meal between 8:00 AM and 10:00 AM, a point is added to Employee_Value[0], since this is the first hourly interval in Team_Definition. Between 10:00 AM and 12:00 AM, points for upsizing combo meals are stored in Employee_Value[1], and so on.

In the "stores" team style, all the points are stored in the first bucket for comparison with another store. For example, every order of a menu item such as a vanilla shake from any employee in the store causes a point to be added to Employee_Value[0].

Speed of Service (SOS) scoring is done a little differently. Instead of scoring a point per order, SOS stores the time between the defined time for SOS. That is, the system tracks SOS starting from either the First Key or First Item entered in the POS terminal. The system then records the elapsed time until the Total button or touch zone is pressed or until the order is tendered to the customer. SOS tracking is a known POS system function. For game purposes, the total time to process the order is stored in a field such as Employee_Value, while the number of orders is stored in a field such as Emp SOS_Orders. The average time per order is displayed as the score, with the lowest score winning.

A team is preferably defined by a field containing a byte for each employee. In the "single employee" team style, each of these bytes has a unique incrementing number that indicates that each employee is a different team. In the "teams of employees" team style, the number in the byte is the number of the team that the employee is affiliated with. In the "shift teams" team style, this field is ignored. The first byte indicates the current shift, but this entry is not configurable. In the "hourly teams" team style, this field is used for storing the hourly intervals that define the team. For example, the first entry in Team_Definitions stores the starting interval time, with the second entry storing the ending interval time. In the "stores" team style, all the employees have the same team. For example, Employees 1 through 255 all have an index of 0.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A system with an employee incentive game overlaid on a point of sale (POS) terminal system, comprising:

a back office portion which includes first means for setting up said game on said POS system;

a front office portion which includes second means for an employee to determine a real-time score of said employee compared with all other employees participating in said game.

2. A system according to claim 1, wherein said first means includes:

means for designating a team style;

means for designating a game style; and means for designating game parameters for said game style.

3. A system according to claim 2, wherein said team style is one team style designated from the group consisting of single employee, teams of employees, shift teams, hourly teams, and stores.

4. A system according to claim 2, wherein said game style is one game style designated from the group consisting of combination meals with individual items that are upsized or downsized, specific menu items, and speed of service (SOS).

5. A system according to claim 1, wherein said front office portion further includes means for presenting a question to a non-cashier employee for answering, whereby said non-cashier employee participates in said game.

6. A system according to claim 5, wherein said first means includes means for designating said question to be presented to said non-cashier employee.

7. A system according to claim 1, wherein said front office portion further includes means for presenting a question to said employee for answering, whereby said employee gains extra points in said game.

8. A system according to claim 7, wherein said first means includes means for designating said question to be presented to said employee.

9. A method for implementing an employee incentive game on a point of sale (POS) terminal system, comprising the steps of:

setting up said game on said POS system;

determining a real-time score of an employee participating in said game; and displaying to said employee real-time scores of all other employees participating in said game.

10. A method according to claim 9, wherein said step of setting up includes:

designating a team style;

designating a game style; and designating game parameters for said game style.

11. A method according to claim 10, wherein said team style is one team style designated from the group consisting of single employee, teams of employees, shift teams, hourly teams, and stores.

12. A method according to claim 10, wherein said game style is one game style designated from the group consisting of combination meals with individual items that are upsized or downsized, specific menu items, and speed of service (SOS).

13. A method according to claim 9, further comprising the step of presenting a question to a non-cashier employee for answering, whereby said non-cashier employee participates in said game.

14. A method according to claim 13, wherein said step of setting up includes designating said question to be presented to said non-cashier employee.

15. A method according to claim 9, further comprising the step of presenting a question to said employee for answering, whereby said employee gains extra points in said game.

16. A method according to claim 15, wherein said step of setting up includes designating said question to be presented to said employee.

* * * * *